United States Patent [19]

Mieyal

[11] E Re. 31,528

[45] Reissued Mar. 6, 1984

[54] GRID TEE FOR SUSPENSION CEILINGS OR THE LIKE

[75] Inventor: David F. Mieyal, Strongsville, Ohio

[73] Assignee: Donn Incorporated, Westlake, Ohio

[21] Appl. No.: 320,618

[22] Filed: Nov. 12, 1981

Related U.S. Patent Documents

Reissue of:

[64] Patent No.: 4,206,578
Issued: Jun. 10, 1980
Appl. No.: 929,281
Filed: Jul. 31, 1978

[51] Int. Cl.[3] ..... E04B 5/52

[52] U.S. Cl. ..... 52/730; 52/484; 52/461; 52/781

[58] Field of Search ..... 52/730–732, 52/484, 461, 781

[56] References Cited

U.S. PATENT DOCUMENTS

| | | | |
|---|---|---|---|
| 717,923 | 1/1903 | Rapp | 52/781 |
| 1,143,266 | 6/1915 | Hamilton | 52/528 |
| 1,179,820 | 4/1916 | Gilliland | 52/737 |
| 1,737,033 | 11/1929 | Talbot | 52/515 |
| 3,023,861 | 3/1962 | Bak | 52/484 |
| 3,187,856 | 6/1965 | Lydard | 52/484 |
| 3,284,977 | 11/1966 | Lickliter et al. | 52/726 |
| 3,350,125 | 10/1967 | Adams | 52/DIG. 5 |
| 3,645,051 | 2/1972 | Kolesar | 52/484 |

FOREIGN PATENT DOCUMENTS

| | | | |
|---|---|---|---|
| 130206 | 11/1948 | Australia | 52/729 |
| 656986 | 1/1963 | Canada | 52/730 |
| 751538 | 6/1956 | United Kingdom | 52/732 |

*Primary Examiner*—James L. Ridgill, Jr.
*Attorney, Agent, or Firm*—Pearne, Gordon, Sessions, McCoy, Granger & Tilberry

[57] ABSTRACT

A structure of a grid tee member for suspension ceilings, and a method for producing such structure is disclosed. Such grid tee provides a web, a bulb at one web extremity and a flange at the other web extremity. The tee section includes three strips of material in which the first strip is relatively thin and is shaped to provide the web, a portion of the bulb and a portion of the flanges. A separate cap strip is secured to the flanges on the side thereof remote from the web and separate stiffening material having a generally U-shaped cross section is located within the bulb with the base of the U located at the extremity of the section. The three strips provide a structure in which material is concentrated at the extremities and is therefore efficiently placed to provide a high moment of inertia and high rigidity to the total structure. The thickness of the three strips is separately selected so that the material forming the section efficiently functions to provide a cross section in which the centroid is substantially midway between the extremities. The illustrated structure is produced by a method in which the stiffener strip and the strip forming the main structure of the section are lance knitted while the two strips are in the flat condition and then are simultaneously formed to produce the bulb with a U-shaped stiffener enclosed within the bulb.

38 Claims, 7 Drawing Figures

Fig. 1
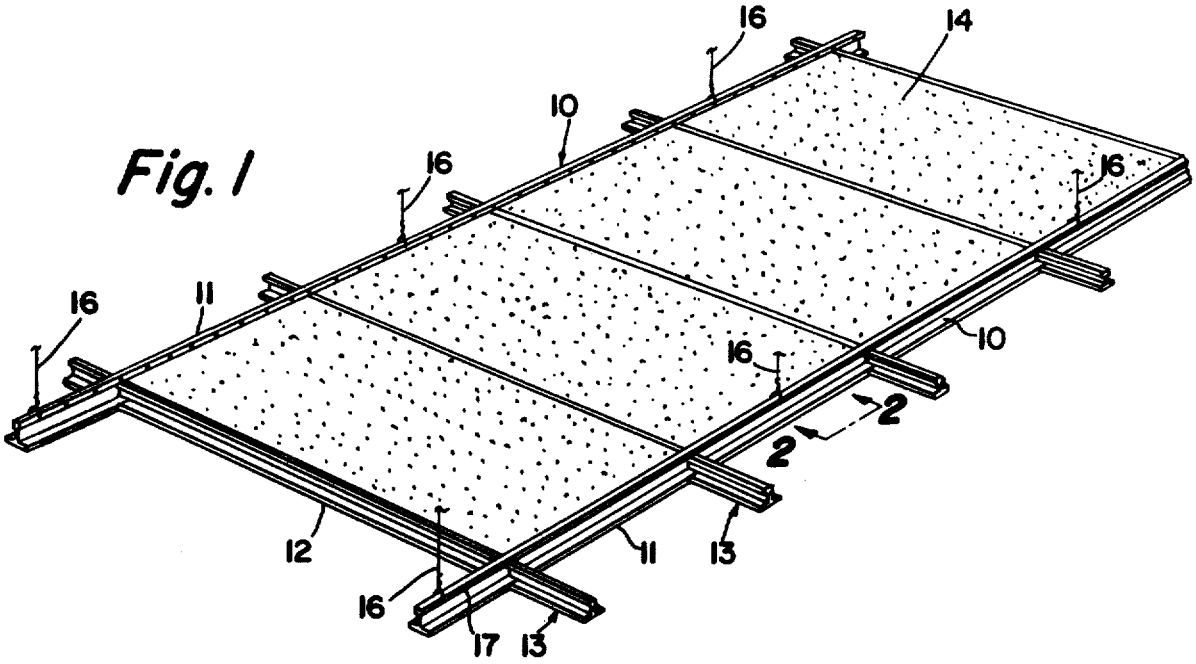
Fig. 2
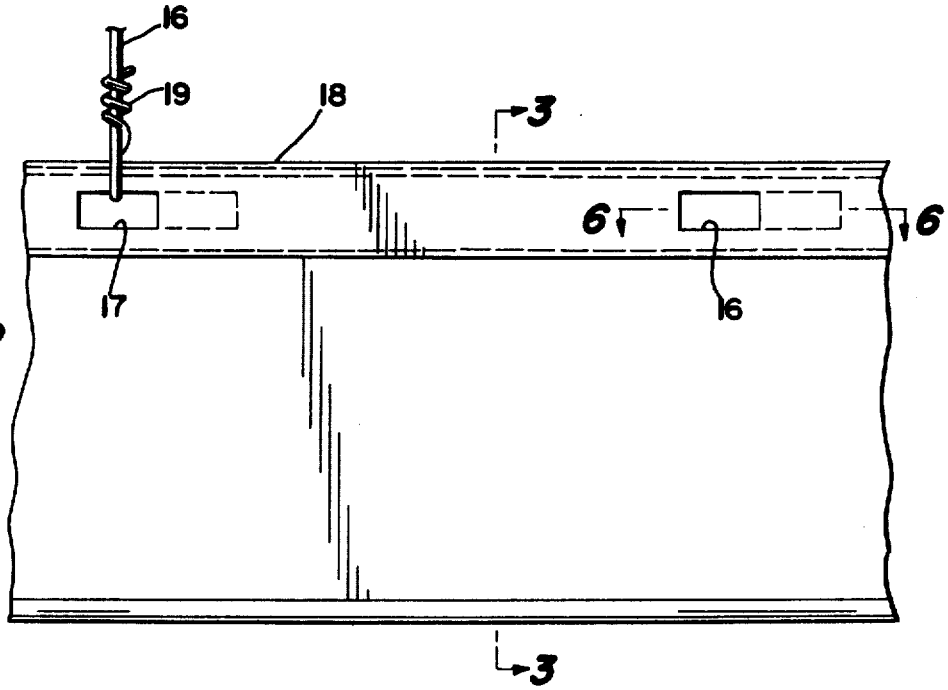
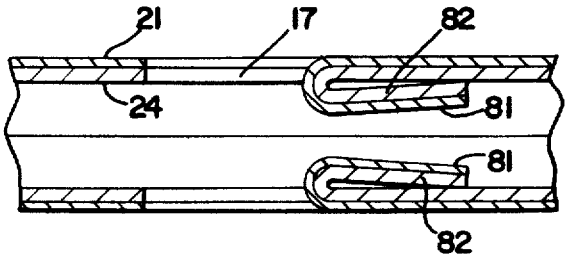
Fig. 6

GRID TEE FOR SUSPENSION CEILINGS OR THE LIKE

Matter enclosed in heavy brackets [ ] appears in the original patent but forms no part of this reissue specification; matter printed in italics indicates the additions made by reissue.

BACKGROUND OF THE INVENTION

This invention relates generally to grid members for suspension ceilings and more particularly to a novel and improved grid tee formed with an optimum cross section which requires less material while still meeting industry requirements for such members.

PRIOR ART

Grid tees for suspension ceilings are well known. Such grids are usually shaped as an inverted "T" shape providing a central web having an enlargement or bulb at its upper edge and providing oppositely extending flanges along its lower edge. Such grid tees are provided with various types of end connections so that they can be interconnected to provide a grid having rectangular openings into which ceiling panels are fitted and supported. Usually the grids include main runs which are suspended at unform intervals from the building structure by various means. One common system utilizes hanger wires which are looped through openings in the bulb of the main tee grid members at substantially uniform spacing or intervals along the main runs. The grid tees of the main runs are therefore unsupported along spans between the adjacent supports. Cross tee members are connected between and are supported by the main runs in a pattern to complete the grid system.

Industry standards require that in a completed grid the tees do not deflect or sag down between supports more than a specified amount. In commercial systems the grid tees must not deflect down between the supports more than 1/360th of the length of the span or interval between supports. When sag is limited in this respect, the assembled ceiling appears to be level and planar, providing a desirable appearance. For example, where the ceiling grid is supported along the main runs at four-foot intervals the four-foot span between supports should not deflect down more than four feet divided by 360 or more than 0.1333 inches. In a five-foot span the deflection should not exceed 0.1666 inches.

When grid tees are formed of sheet metal, the general practice in the past has been to select a metal thickness which is sufficiently great so that when the grid tee is shaped to the required envelope the resulting tee provides sufficient stiffness to meet the deflection requirement. The thickness of the web in such grid tees is usually determined by the thickness of the material used to form the remainder of the tee. However, the web does not contribute significantly to the stiffness of the resulting structure and, therefore, the resulting structure often has a web which is thicker than is required and more material is used to form the tee than is necessary.

U.S. Pat. Nos. 3,023,861 and 3,187,856 disclose grid tees formed of a base metal shaped so that the web and the bulb are formed in their entirety by the base metal along with a portion of the flanges. In such patents a facing cap is mounted on the face of the flange and has the effect of increasing the effective thickness of the flange by providing additional material at the flange extremity of the grid tee. However, in such devices the bulb formed of the base metal is relatively thin and the centroid of the moment of inertia of the section is displaced significantly from a mid position between the two extremities of the section. Consequently, the stiffness of the structure is not provided with the efficiency that is achieved with this invention.

Another form of prior art grid tee is illustrated in FIG. 7, in which the grid tee is formed of a single strip of metal shaped from one edge to form the bulb and along the other edge to form the flanges. Such grid tee is, however, not symmetrical about the central axis of the section and must be formed of the thicker material to provide the necessary strength. In such structure the bulb is not a closed structure and is not as strong as a closed bulb. Further, the flange must be supported in a cantilever fashion from one side thereof and such structure requires additional material thickness for a given strength requirement.

SUMMARY OF THE INVENTION

In accordance with the present invention, a novel and improved grid tee structure is provided which requires less material than comparable structures of the prior art while still meeting the industry requirements with respect to deflection. In the grid tee structure of the present invention the material forming the tee is located so as to provide the required stiffness or deflection resistance with a minumum amount of material usage.

In the illustrated embodiments a thin strip material is selected to form the basic structure including the exterior portion of the bulb, the web and the nonexposed portion of the flanges. A separate cap is mounted to cover the flanges and provide additional material to the section at the flange extremity thereof. The effective thickness of the bulb is increased by enclosing within the bulb a reinforcing or stiffening strip which is located substantially at the bulb extremity of the section. Consequently, an increased proportion of the material forming the tee is located at the two extremities where it efficiently contributes to the stiffness of the structure, and the web, which does not contribute significantly to stiffness, is relatively thin. Consequently, a given industry standard can be met by a tee formed of substantially less material than in the typical prior art tees. Further, since the thickess of the cap and the thickness of the reinforcing material can be separately selected with optimum design considerations in mind, an optimum use of the material is achieved.

BRIEF DESCRIPTION OF THE DRAWINGS

FIG. 1 is a fragmentary, perspective view of a portion of a suspended ceiling illustrating the manner in which a typical grid is often assembled and installed;

FIG. 2 is a fragmentary side view of a grid tee incorporating the present invention, illustrating the manner in which the grid may be suspended;

FIG. 6 is a fragmentary section taken along 6—6 of FIG. 2; and,

DETAILED DESCRIPTION OF THE DRAWINGS

Figure 3:
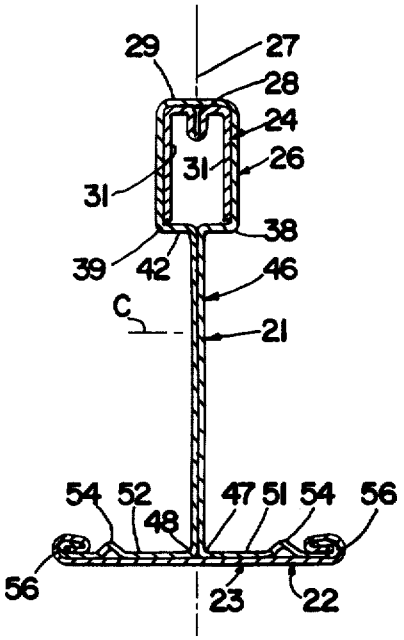
FIG. 3 is a cross section of one embodiment of a grid tee incorporated in the present invention.

FIG. 1 illustrates a representative type of suspension ceiling having a plurality of parallel main runs 10 consisting of end-connected main tee members 11. At intervals along the length of the main runs 10 cross tees 12 are connected to the main runs to produce cross runs 13. The main runs and cross runs cooperate to provide a grid of rectangular openings each of which is sized to receive a ceiling panel 14.

Generally, the grid, and in turn the entire ceiling system, are supported by support means spaced at intervals along the main runs 10. In the embodiment illustrated in FIG. 1 the main runs 10 are supported by wire hangers 16, which are suitably connected to the building structure, are looped through lateral openings 17 in the bulb 18 of the tees, and are twisted as best illustrated at 19 in FIG. 2. Such hanger wires are normally spaced at uniform intervals along the length of the main runs and such interval may, for example, be four feet or five feet so that the main runs are supported in spans of such length between the hanger wires 16. As discussed above, the tees must be sufficiently resistant to deflection to prevent excessive sagging between adjacent hanger wires 16. One industry standard mentioned above requires that the sag not exceed one 360th of the length of the span. When the sag or deflection between support wires is limited in this way, the assembled ceiling appears to be flat or planar and the sagging which does exist to such an extent is not noticeable. The amount of sagging of a given tee member is, of course, a function of the span length and the weight per foot supported by the tees of the ceiling system.

In accordance with the present invention, tee members are formed to provide the maximum resistance to deflection for a given amount of material used to form the tee member. Further, in accordance with this invention the tee member can be more accurately designed to efficiently support any given load.

Figure 4:
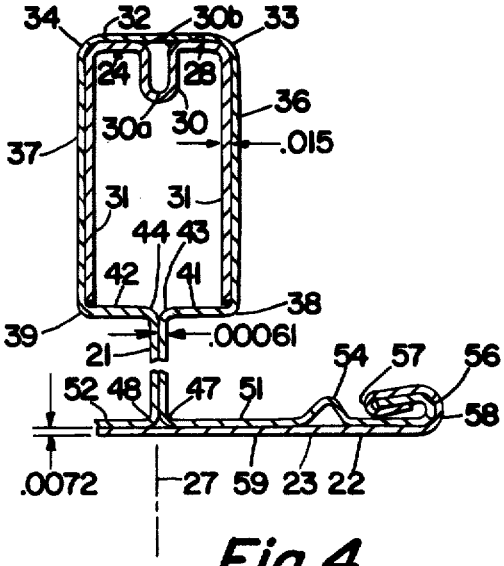
FIG. 4 is an enlarged, fragmentary section of a portion of the grid tee of FIG. 3 better illustrating the wraparound connection at the edge of the flange and the bulb structure.

FIGS. 3 and 4 illustrate a first embodiment of this invention. It should be understood that the invention is equally applicable in the manufacture of both main tee members for use in main runs and for cross tee members for use in cross runs. In a given grid system the usual practice is to form the cross tees with the same cross section as the main tees.

As best illustrated in FIG. 3, the tee of the first embodiment includes three separate metal strips. The first strip 21 provides the basic structure of the tee. The second strip 22 is secured at the flange section 23 and the third strip 24 is located within the bulb 26 of the tee. The tee section illustrated is symmetrical about a central plane 27 and is formed with a rectangular bulb 26 having relatively sharp corners. In this illustrated embodiment the stiffening or third strip 24 is shaped as a generally U-shaped channel having its base 28 adjacent to the upper extremity 29 of the tee section and providing depending parallel legs 31 extending substantially to the lower edge of the bulb. The strip 21 is formed to encircle the stiffening strip 24 and to cooperate therewith to produce the rectangular shaped bulb adjacent to the upper extremity 29.

In the embodiment of FIGS. 3 and 4, the generally U-shaped stiffening strip 24 is formed with an accordion pleat 30 at the center of the extremity of the bulb 26. Such pleat is formed by a reverse bend at 30a in the strip 24 and oppositely extending right angle bends at 30b. From the bends at 30b the central portion 32 of the strip 21 extends horizontally along the base 28 of the stiffener strip 24 to relatively sharp corners at 33 and 34 and then down along the sides of the bulb along portions 36 and 37 adjacent to the legs 31. At the lower ends of the legs 31 the strip 21 is bent inwardly at 38 and 39 to provide horizontal portions 41 and 42 which extend inwardly to the central plane 27. Opposite right angle bends are provided at 43 and 44 so that the strip 21 provides a web portion consisting of two thicknesses of the strip 21 in face-to-face adjacency extending along the central plane 27 from the bulb 26 to the flange 23. At the flange edge of the web 46 the strip 21 is provided with opposite right angle bends 47 and 48 so that the strip 21 provides oppositely extending flange portions 51 and 52. Each of the flange portions 51 and 52 is provided with a longitudinally extending raised rib 54 and a reverse bend 56 best illustrated in FIG. 4.

The second strip 23 is secured in face-to-face adjacency with the flange portions 51 and 52 by two reverse bends 57 and 58 so that the edge of the facing or second strip 23 is wrapped around the edge of the associated flange and both strips are bent together at the bends 57 and 58. With this structure three are five layers of material adjacent to each edge of the flange, thereby concentrating the amount of material provided adjacent to the flange extremity 59.

With this structure in which the flange of the tee consists of two separate strips, it is possible to select the thickness of the two strips to provide substantially any total flange thickness desired. Further, the use of the ribs 54 and the double wraparound connection between the second strip 22 and the first step 21 provides a concentration of additional material adjacent to the flange extremity 59 of the tee section and a lengthwise interconnection so the composite structure functions in deflection as a unit.

Similarly, the use of two separate materials to form the bulb provides a structure in which thickness is concentrated adjacent to the upper extremity 29 of the tee section without utilizing a thick material to form the basic tee structure. The accordion pleat provides two advantages. First, it provides a further concentration of material at the upper extremity of the bulb symmetrically along the central plane 27 and second, it facilitates the rolling operation preferably used to form the composite bulb as discussed below. Here again, a lengthwise connection is provided between the strips, as discussed below, so the composite structure again functions as a unit in deflection. With this structural arrangement the first strip 21 can be formed of extremely thin stock. Because the bulb is relatively narrower, a thicker stiffening member 24 is usually selected to that the effective thickness in the bulb zone is relatively high. Preferably the thicknesses of the various strips are selected so that the cross section is provided with a moment of inertia having a centroid relatively close to the midpoint between the two extremities 29 and 59 of the sections as illustrated by the dotted line C in FIG. 3.

In one preferred structure the first stip 21 has a thickness of 0.0061 inches, the second strip 22 has a thickness of 0.0072 inches, and the third strip 24 has a thickness in the range of between about 0.012 and 0.030. The thicker material for the third strip is used in the manufacture of grid tees for heavy duty service and the thinner thickness is used for grid tees of intermediate duty. In such example the first strip 21 is preferably embossed to increase its rigidity.

It is possible, by properly selecting the thickness of the material of each of the strips, to establish an efficient cross section having a desired stiffness while still maintaining the grid shape within a standard envelope. For example, such grid having strips of the thicknesses mentioned above has a total height of 1.5 inches, a flange width slightly less than 1 inch, a bulb width of ¼ of an inch, and a bulb height of 0.5 inches. The overall envelope or size of the tee is usually dictated by the type of grid system in which the tee members are to be installed and the above dimensions are examples for one typical grid envelope.

Because the grid is symmetrical about the central plane 27 and provides concentrations of material substantially adjacent to the two extremities 29 and 59, the grid section has a moment of inertia which is substantially maximized for a given amount of material and provides the grid with the centroid located substantially midway between the two extremities. Such tee therefore efficiently provides a substantial resistance to deflection for a given amount of material required to produce the tee member. Further, in such structure the thickness of the web tends to be minimized, but this does not detract from the stiffness of the total assembly since the web portion of the tee member provides little contribution to the rigidity or resistance of deflection of the total system.

It should be understood that although a channel-shaped stiffener provides effective utilization of the material within the bulb, in accordance with the broader aspects of this invention, stiffeners of other shapes can be utilized. It should also be understood that although the provision of the ribs 54 and the double bends at the edges of the flange concentrates material adjacent to the flange extremity, other structural arrangements can be used to provide such concentration of material. In practice it is desirable to use a material for the first strip 21 which is embossed to increase its rigidity and to utilize a material for the cap strip 23 which is prefinished along one side to present a finished appearance when the tee member is installed in a grid system.

It should be understood that in the drawings the thickness of the various elements or strips is greatly exaggerated for purposes of illustration but that the thickness of the basic strip utilized to form the web should be selected to be substantially as thin as possible for a given grid member and the thicknesses of the cap strip and the stiffening strip should be selected to provide the required moment of inertia and a location of the centroid of the section which is substantially midway between the two extremities of the section. With the present invention the material savings tend to be about 20% to 25% when compared to conventional symmetrically structured tee sections.

Because the material forming the web is relatively thin, the end connectors provided at each end of the tee members are preferably formed of separate elements which are suitably connected to the tee member and are provided with sufficient thickness and strength to provide the necessary connections. A suitable type of separate end connector is illustrated in the copending application Ser. No. 713,287, filed Aug. 11, 1976 (assigned to the Assignee of the present invention), and such application is incorporated herein by reference to describe a satisfactory end connection which may be used in the manufacture of a tee member in accordance with this invention.

Referring to FIGS. 2 and 6, it is preferable that the stiffening strip 24 be connected to the strip 21 at intervals along its length. Such connection may be provided in any suitable manner, such as by welding or the like, but the illustrated preferred structure for providing such connection is best illustrated in FIGS. 2 and 6 wherein these two strips are lance knitted together. With such structure, opposed tongues 81 are cut from the strip 21 adjacent to associated tongues 82 cut from the strip 24 and the two tongues are bent back along the member as best illustrated in FIG. 6. In practice such tongues are formed in the grid member at regular intervals along its length. They function to connect the two strips 21 and 24 together so that the two strips effectively provide a unitary structure. Further, the lancing produces the opening 17 at regular intervals along the length of the tee member to receive the support wires 16 or the like.

Preferably the tee is formed by a process in which the two strips 21 and 24 are initially lance the two strips are then simultaneously roll formed to produce the bulb 26 which encloses the U-shaped channel member 24. During such operation the strip 21 is also shaped to provide the web 46 and flange portions 51 and 52. When an accordian pleat 30 is formed in the strip 24 such strip is preferrably provided with a central ridge before it is lance stiched to the strip 21. The cap strip 22 is then roll formed simultaneously with the edges of the strip 21 to provide the connection and final shape to the flange.

Figure 5:
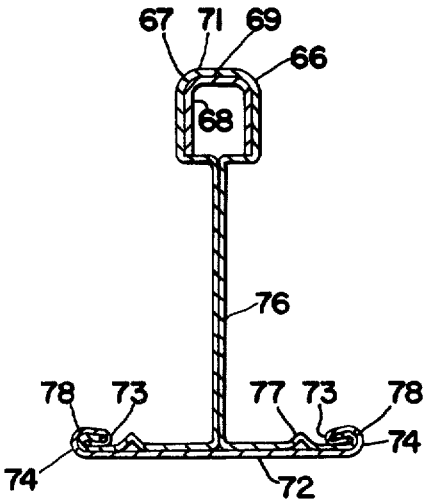
FIG. 5 is a cross section of a second embodiment of a grid tee in accordance with the present invention.

FIG. 5 illustrates a second embodiment of this invention which is very similar to the first embodiment of FIGS. 3 and 4. In this embodiment the structure differs primarily by the formation of the bulb without the accordion pleate and with radiused corners at 66 and 67 rather than sharp corners, as in the first embodiment. The remainder of the parts of the structure are substantially identical. The stiffener 68 is again formed with a generally U-shaped cross section having its base 69 adjacent to the upper extremity 71 of the tee section. Here again, this embodiment provides a cap strip 72 provided with two bends 73 and 74 at the flange edges and the basic strip 76 is provided with a rib 77 and a reverse bend 78.

Figure 7:
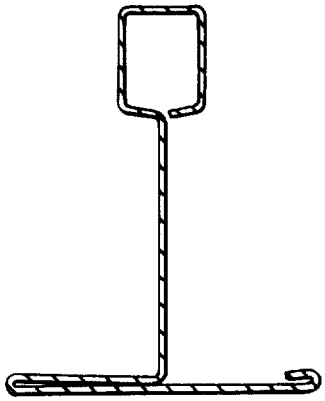
Fig. 7 (PRIOR ART)
FIG. 7 is a cross section of one prior art grid tee.

In the prior art illustrated in FIG. 7, a single strip is shaped to provide the entire tee member. Such structural shape provides a single thickness for the web, and therefore provides a relatively thin web thickness. However, with such structure in which the flange is nonsymmetrical and the bulb isnot secured to the web along both edges, thicker material must be utilized to provide given strength. Consequently, a tee member formed in such manner does not provide the same efficient use of the material even though the web is relatively thin compared to the thickness of the bulb and the flange and even though such tee section tends to concentrate material at the two extremities of the section. Further, since tees are usually formed of prefinished material, the entire tee member is finish coated and this further increases material cost of manufacture.

Although preferred embodiments of this invention are illustrated, it is to be understood that various modifications and rearrangements may be resorted to without departing from the scope of the invention disclosed and claimed.

What is claimed is:

1. An elongated grid tee for suspension ceilings or the like having a web, a bulb, and oppositely extending flanges comprising a first elongated strip of thin metal bent along its center to provide a closed bulb and extending from said bulb in face-to-face abutting adjacency to provide a central web having two abutting layers and at the edge of said web remote from said bulb bent to provide oppositely extending flanges, a cap formed of a separate second strip of thin metal secured to and extending along substantially the entire length of said flanges on the side thereof remote from said bulb, and a stiffener formed of a separate third strip of metal enclosed within said bulb, a substantial portion of said stiffener engaging the surface of said bulb so that said stiffener and the material of said bulb cooperate to provide a substantially unitary structure, said stiffener and cap increasing the material at the extremities of said tee without increasing the thickness of said web.

2. An elongated grid tee as set forth in claim 1, wherein said third strip of metal is substantially thicker than said first strip of metal, and the centroid of the tee is substantially midway between its extremities.

3. An elongated grid tee as set forth in claim 2, wherein said stiffener is positioned with a substantial portion thereof substantially adjacent to the bulb extremity of said tee.

4. An elongated grid tee as set forth in claim 3, wherein said cap is bent around the opposite edges of said flanges to secure said cap and to provide additional material at the flange extremity of said tee.

5. An elongated grid tee as set forth in claim 3, wherein said cap is provided with a double reverse bend along the edges of said flanges and said flanges are provided with a single reverse bend to connect said cap to said flanges and provide an edge bead having five layers of material.

6. An elongated grid tee as set forth in claim 5, wherein said first strip is provided with a longitudinal rib extending lengthwise of said flanges inwardly from said bead to provide additional stiffness and additional material adjacent to the web extremity of said tee.

7. An elongated grid tee as set forth in claim 3, wherein said stiffener is generally U-shaped in cross section with the base thereof located along the extremity of said tee.

8. An elongated grid tee as set forth in claim 7, wherein said stiffener and said first strip are secured together at intervals along their length.

9. An elongated grid tee as set forth in claim 7, wherein said stiffener is formed with an inwardly directed pleat substantially at the center of the base thereof.

10. An elongated grid tee as set forth in claim 9, wherein said first elongated strip bridges across said pleat.

11. An elongated grid tee as set forth in claim 7, wherein said first strip and said stiffener are lance stitched together at intervals along their length to connect them together and to provide lateral openings through said bulb to receive hanger means.

12. An elongated grid tee as set forth in claim 11, wherein said first strip is formed of embossed metal to increase its rigidity.

13. An elongated grid tee as set forth in claim 11, wherein said second strip is coated with a finish material and provides a finished exposed surface of said tee when said tee is installed in a ceiling system.

14. An elongated grid tee as set forth in claim 13, wherein said tee is provided with end connectors for connecting said tee to other tees and to form therewith a grid, and said end connectors are formed of separate pieces secured to the ends of said tee.

15. An elongated grid tee for suspension ceilings or the like having a web extending along a central plane, a bulb at one extremity of said web and a flange at the opposite extremity of said web and which is substantially symmetrical with respect to said central plane, comprising an elongated first strip of thin metal bent to form said web providing two layers of abutting material, a portion of said flange and a portion of said bulb; a cap formed of a second strip of thin metal engaging and secured to said portion of said flange on the side thereof opposite said web along substantially the entire length thereof; and a third strip of metal having a thickness substantially greater than the thickness of said first and second strips secured to said portion of said bulb along substantially the entire length thereof, a substantial portion of said third strip engaging the surface of said portion of said bulb so that they cooperate to provide a substantially unitary structure, said second and third strips providing additional material on said tee so that the effective thickness of said web and said bulb are increased to concentrate material at the extremity of said tee without increasing the thickness of said web and so that the centroid of the moment of inertia of said tee is substantially midway between said extremities.

16. An elongated grid tee as set forth in claim 15, wherein said cap is provided with a reverse bend around the opposite edges of said flange portion of said first strip to secure said cap and to provide additional stiffness at the flange extremity of said tee.

17. An elongated grid tee as set forth in claim 15, wherein said first strip has a thickness substantially no greater than about 0.0061 inches, said second strip has a thickness substantially no greater than about 0.0072 inches, and said third strip has a thickness within the range of about 0.012 inches and 0.030 inches.

18. An elongated grid tee as set forth in claim 17, wherein said first strip is embossed to increase its rigidity, and end connectors are provided at each end of said tee, said end connectors being formed as separate pieces connected to said tee.

19. An elongated grid tee as set forth in claim 15, wherein said cap is formed with a double reverse bend along the opposite edges of said flange portions to provide three layers of cap material at the flange extremity of said tee.

20. An elongated grid tee as set forth in claim 19, wherein the opposite edges of said flange portions of said first strip are formed with a reverse bend to provide two layers of first strip material at the flange extremity at said tee.

21. An elongated grid tee as set forth in claim 20, wherein said bulb encloses said third strip, and said third strip is connected to said first strip along its length.

22. An elongated grid tee as set forth in claim 21, wherein said third strip is a U-shaped channel with a base of said U located at an extremity of said tee.

23. An elongated grid tee as set forth in claim 22, wherein said third strip is formed with an accordion pleat along the extremity of said bulb.

24. An elongated grid tee having a web, a bulb, and oppositely extending flanges for use in suspended ceilings or the like and which is symmetrical about a central plane comprising a first elongated strip of thin metal, said first strip extending laterally inward from one edge thereof to a first substantially right angle bend located substantially at said central plane to provide a first flange portion, extending from said first right angle bend along said plane to provide a first web portion, providing a reverse bend at the end of said first web portion to provide a portion of said bulb, extending from said reversed bend back substantially along said central plane in abutting engagement with said first flange portion to a second right angle bend to provide the remaining portion of said web, and extending laterally from said second right angle bend to its opposite edge to provide a second web portion, a cap formed of a separate elongated second strip of thin metal engaging substantially the entire length of said first and second flange portions on the side thereof remote from said web connected at its edges to said first elongated strip at the edges thereof, and a third elongated strip of metal engaging and secured to said first strip at said bulb along substantially the entire length thereof, said second and third strip cooperating to concentrate the material of said tee at the extremities of said web without increasing the thickness of said web and cooperating to provide said tee with a moment of inertia having a centroid located substantially midway between the extremities of said tee.

25. An elongated grid tee as set forth in claim 24, wherein said cap is formed with double reverse bends along its edges, and said first strip is provided with reverse bends along its edges so that at least five layers of material are provided at the edges of said flanges.

26. An elongated grid tee as set forth in claim 24, wherein said first strip is formed with a longitudinal rib substantially adjacent to the edge of each of said flanges.

*27. A grid tee for suspension ceilings or the like having a central web; a bulb along one side of said web, and oppositely extending panel-supporting flanges along the opposite side of said web, comprising an elongated strip of metal bent substantially along its center to form a closed bulb, said strip of metal extending in face-to-face adjacency to form a double layer central web extending from said bulb, said strip of metal being bent to extend laterally in opposite directions to form panel-supporting flanges along the side of said web remote from said bulb, said bulb providing at least two laterally extending layers of metal along the extremity of said bulb remote from said web to increase the load-carrying capacity of said tee, a substantial portion of said two laterally extending layers engaging each other, said two laterally extending layers being sufficiently interconnected along their length so that they cooperate to provide a substantially unitary structure along the extremity of said bulb and extending along substantially the entire length of said tee, said two laterally extending layers coacting as a unitary structure to resist deflection of said grid tee.*

*28. A grid tee as set forth in claim 27, wherein one of said two laterally extending layers is provided by said elongated strip of metal and the other of said two laterally extending layers is provided by a separate strip secured to said elongated strip.*

*29. A grid tee as set forth in claim 28, wherein said separate strip is enclosed within said bulb.*

*30. A grid tee as set forth in claim 29, wherein said separate strip is U-shaped.*

*31. A grid tee as set forth in claim 28, wherein said separate strip is U-shaped.*

*32. A grid tee for suspension ceilings or the like, comprising a first strip of metal bent to provide a hollow, closed bulb, said first strip providing a central web extending from said bulb and oppositely extending panel-supporting flanges along the side of said web remote from said bulb, and a separate strip of metal secured to said bulb of said first strip providing a separate metal layer substantially adjacent to the extremity of said tee to increase the load-carrying capacity thereof, said separate metal layer of said second strip being in face-to-face abutting contact with the adjacent metal of said bulb along said extremity of said tee and extending the length of said tee, said two abutting layers of metal being sufficiently connected along the length of said tee so that they cooperate to provide a substantially unitary structure along the length of said tee resisting the deflection of said tee.*

*33. A grid tee as set forth in claim 32, wherein said second strip of metal is enclosed by said first strip.*

*34. A grid tee as set forth in claim 33, wherein said strips are lance-stitched together along their length.*

*35. A grid tee as set forth in claim 32, wherein a cap formed of a third separate strip is secured to said flanges to provide multilayer flanges.*

*36. A grid tee as set forth in claim 32, wherein said first strip provides a web including two layers in face-to-face abutting contact.*

*37. A grid tee as set forth in claim 32, wherein said second strip is an inverted U-shape providing a laterally extending metal layer substantially adjacent to the extremity of said tee and two legs extending in a direction toward said web, and said legs are lance stitched to the metal of said bulb.*

*38. A grid tee for suspension ceilings or the like having a central web, a bulb along one side of said web, and oppositely extending panel-supporting flanges along the opposite side of said web, comprising an elongated strip of metal bent substantially along its length to form a bulb, said strip of metal extending from said bulb to form a central web extending from said bulb, said strip of metal being bent to extend laterally in opposite directions to form panel-supporting flanges along the side of said web remote from said bulb, said bulb providing at least two laterally extending layers of metal along the extremity of said bulb remote from said web to increase the load-carrying capacity of said tee.*

* * * * *

Disclaimer

Re. 31,528.—*David F. Mieyal,* Strongsville, Ohio. GRID TEE FOR SUSPENSION CEILINGS OR THE LIKE. Patent dated Mar. 6, 1984. Disclaimer filed May 7, 1984, by the assignee, *Donn, Inc.*

Hereby enters this disclaimer to claim 38 of said patent.

[*Official Gazette April 23, 1985.*]